United States Patent
Sun et al.

(10) Patent No.: US 10,057,842 B2
(45) Date of Patent: Aug. 21, 2018

(54) DEVICE AND METHOD FOR ALLOCATING PHYSICAL CELL IDENTIFIER OF MOBILE BASE STATION

(71) Applicant: SONY CORPORATION, Tokyo (JP)

(72) Inventors: Chen Sun, Beijing (CN); Jinhui Chen, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/524,924

(22) PCT Filed: Oct. 23, 2015

(86) PCT No.: PCT/CN2015/092704
§ 371 (c)(1),
(2) Date: May 5, 2017

(87) PCT Pub. No.: WO2016/074558
PCT Pub. Date: May 19, 2016

(65) Prior Publication Data
US 2017/0353913 A1 Dec. 7, 2017

(30) Foreign Application Priority Data

Nov. 14, 2014 (CN) .......................... 2014 1 0649388

(51) Int. Cl.
*H04W 48/16* (2009.01)
*H04W 64/00* (2009.01)
*H04W 84/18* (2009.01)

(52) U.S. Cl.
CPC ......... *H04W 48/16* (2013.01); *H04W 64/003* (2013.01); *H04W 84/18* (2013.01)

(58) Field of Classification Search
CPC ........ G01S 19/44; G01S 19/46; G01S 5/0072; H04W 4/028; H04W 64/03; H04W 48/16; H04W 64/003; H04W 84/18
See application file for complete search history.

(56) References Cited

U.S. PATENT DOCUMENTS 7,127,257 B2 * 10/2006 Riley .................... G01S 5/0205
455/414.1
2006/0215595 A1 * 9/2006 Hancock ........... H04L 29/12009
370/328

(Continued)

FOREIGN PATENT DOCUMENTS

| CN | 102098708 A | 6/2011 |
|---|---|---|
| CN | 103444222 A | 12/2013 |

(Continued)

OTHER PUBLICATIONS

International Search Report dated Dec. 28, 2015 in PCT/CN2015/092704 filed Oct. 23, 2015.

*Primary Examiner* — Nizar Sivji
(74) *Attorney, Agent, or Firm* — Xsensus, LLP

(57) ABSTRACT

A device and a method for allocating physical cell identifier (PCI) of a mobile base station. The device includes: an acquiring unit, configured to acquire a location and a movement speed of a mobile base station; a determining unit, configured to determine a valid time interval of a PCI of the mobile base station based on at least one of the location and the movement speed; an information collection unit, configured to collect, in the valid time interval, network configuration related information within a preset range of the location of the mobile base station; and a PCI determining unit, configured to determine a PCI for the mobile base station based on the network configuration related information within the preset range of the location of the mobile base station.

15 Claims, 5 Drawing Sheets

(56) References Cited

U.S. PATENT DOCUMENTS

| | | | | |
|---|---|---|---|---|
| 2007/0105556 | A1* | 5/2007 | Hiyama | H04W 60/00 455/435.1 |
| 2009/0092097 | A1* | 4/2009 | Nylander | H04W 36/0061 370/331 |
| 2009/0219900 | A1* | 9/2009 | Kokkinen | B61L 15/0027 370/338 |
| 2011/0124330 | A1* | 5/2011 | Kojima | H04W 36/32 455/424 |
| 2014/0080468 | A1 | 3/2014 | Zhang et al. | |
| 2015/0185331 | A1* | 7/2015 | Dai | G01S 19/44 342/357.27 |
| 2015/0312832 | A1* | 10/2015 | Huang | H04W 36/0055 370/338 |
| 2016/0335894 | A1* | 11/2016 | Liu | G08G 1/123 |

FOREIGN PATENT DOCUMENTS

| | | |
|---|---|---|
| CN | 103533656 A | 1/2014 |
| WO | 2014/024496 A1 | 2/2014 |

* cited by examiner

DEVICE AND METHOD FOR ALLOCATING PHYSICAL CELL IDENTIFIER OF MOBILE BASE STATION

FIELD

The disclosure relates to device and method for PCI allocation of a mobile base station, and in particular to a mobile base station, a network device for allocating and updating PCI for the mobile base station, and a method for allocating and updating PCI for the mobile base station.

BACKGROUND

In LTE/LTE-A system, physical cell identifiers (PCIs) are used for identifying cells, and there are a total of 504 available PCIs Available PCIs may be allocated to cells served by all base stations in the communication system, including macro cells of macro base stations, small cells of small base stations and relaying cells of relay nodes, based on certain criteria.

Currently, according to a report on requirement vision of IMT-2020 system and related techniques from International Telecommunication Union (ITU) and Mobile and wireless communications Enablers for the Twenty-twenty Information Society (MEITS), concepts of ultra-dense network (UDN) and mobile network are introduced into the IMT-2020 system. The introduction of UDN indicates a large-scale deployment of small base stations in an IMT-2020 oriented communication system. Therefore, the number of base stations in the system will far exceed the number of available PCIs in the long term evolution/long term evolution-advanced (LTE/LTE-A) system (that is, 504). In another aspect, the deployment of small base stations is usually not planned in advance, and the number and the deployment locations of small base stations are often determined randomly, thus the network condition of the IMT-2020 communication system varies greatly depending on geographic locations. The introduction of MN indicates that mobile base station (such as a small base station which is movable) is present in the conventional communication system where base stations are stationary. When the mobile base station enters a new geographic area and one or more base stations (to which PCIs are allocated) already exist in said geographic area, there is a problem of how to allocate a PCI to the mobile base station.

Since the network condition of the IMT-2020 oriented communication system varies depending on geographic locations, and the network environment for the mobile base station constantly varies during the movement of the mobile base station, PCI conflict and confusion may occur in the geographic area in the vicinity of the mobile base station, if the PCI for the mobile base station is allocated improperly.

The conventional PCI allocation technique is directed towards stationary base stations, without considering the case where a mobile base station passes through an area with high cell density. In the area with high cell density, 504 available PCIs are often not sufficient due to the existence of a large number of base stations. Therefore, when allocating a PCI for the mobile base station entering the area, a PCI for a neighbor base station is inevitably reused, and reuse of the PCI may result in interference between two cells using the same PCI. The interference to the highly-loaded cell and the interference to the low-loaded cell have different influences to overall performance of the network. Therefore, there is a demand for a method of effectively allocating a PCI for the mobile base station, which can minimize the influence of the interference generated due to reuse of PCI.

In another aspect, since the mobile base station may experience different network environments during movement, for example, the mobile base station may move from an area with low cell density (for example, a suburban area) to an area with high cell density (for example, an urban area), the PCI for the mobile base station needs to be frequently updated to adapt to new network environment. In this case, there is a demand for a mechanism for updating the PCI for the mobile base station at a certain time interval.

SUMMARY

In order to effectively manage numerous randomly-deployed small base stations, a self-organizing network (SON) provides an effective solution. SON includes self-configuration, self-optimization and self-healing, where self-configuration includes self-configuration of PCIs. In order to enhance and improve the PCI self-configuration procedure in the SON self-configuration, the present disclosure provides a mobile base station, a method for allocating and updating PCI for the mobile base station and a network device for allocating and updating PCI for the mobile base station, in order to reduce or avoid PCI conflict and confusion during the movement of the mobile base station, and to reduce manual participation of technicians in configuration of the base station, thereby reducing operation cost to a mobile operator.

According to an aspect of the present disclosure, there is provided an electronic device for managing a mobile base station, which comprises: an acquisition unit configured to acquire location and movement speed of the mobile base station; and a determination unit configured to determine, in response to the acquisition, a valid time interval for physical cell identity (PCI) of the mobile base station based on at least one of the location and the movement speed.

The electronic device for managing a mobile base station may further comprise an information collection unit configured to collect, in response to the determination, information relating to network configuration within a predetermined range where the mobile base station is located, when the valid time interval is expired.

The electronic device for managing a mobile base station may further comprise a PCI determination unit configured to reuse the PCI of one of the one or more neighbor base stations within the predetermined range as the PCI of the mobile base station based on the information relating to the network configuration.

According to another aspect of the present disclosure, there is provided a method for managing a mobile base station, which comprises: acquiring location and movement speed of the mobile base station; and determining, in response to the acquisition, a valid time interval for physical cell identity (PCI) of the mobile base station based on at least one of the location and the movement speed.

The method for managing a mobile base station may further comprise: collecting, in response to the determination, information relating to network configuration within a predetermined range where the mobile base station is located, when the valid time interval is expired; and reusing the PCI of one of one or more neighbor base stations within the predetermined range as the PCI of the mobile base station based on the information relating to the network configuration.

According to another aspect of the present disclosure, there is provided an electronic device for managing a mobile base station, which comprises one or more processors for executing the above method for managing a mobile base station.

According to another aspect of the present disclosure, there is provided an electronic device on a mobile base station side, which comprises: a determination unit configured to determine location and movement speed of the mobile base station; and a physical cell identity (PCI) determination unit configured to determine an updated PCI of the mobile base station when a valid time interval for the PCI of the mobile base station is expired, where the valid time interval is related to at least one of the location and the movement speed of the mobile base station.

According to another aspect of the present disclosure, there is provided an electronic device on a mobile base station side, which comprises: one or more processors configured to determine location and movement speed of the mobile base station; and determine an updated physical cell identity (PCI) of the mobile base station when a valid time interval for the PCI of the mobile base station is expired, where the valid time interval is related to at least one of the location and the movement speed of the mobile base station.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure. In the drawings.

DETAILED DESCRIPTION OF THE EMBODIMENTS

The IMT-2020 oriented communication system integrates the existing communication system, thus the PCI allocation and updating method for the IMT-2020 oriented mobile base station provided according to the present disclosure should be compatible with the LET/LTE-A system. Therefore, the present disclosure is applicable to at least the communication system where only 504 PCIs are currently available. Further, with the evolution of communication technologies, the number of available PCIs may increase. However, there will still be a problem that PCIs are insufficient or need to be updated timely because of deployment of ultra-dense small cells and mobile base stations. At that point, the technical solution of the present disclosure will still apply.

Due to the mobility of the mobile base station, it may enter different geographic areas and thereby experience different network environments. Therefore, the PCI for the mobile base station needs to be updated frequently, so that the mobile base station may acquire a new PCI which adapts to the new network environment when entering the new network environment.

Figure 1:
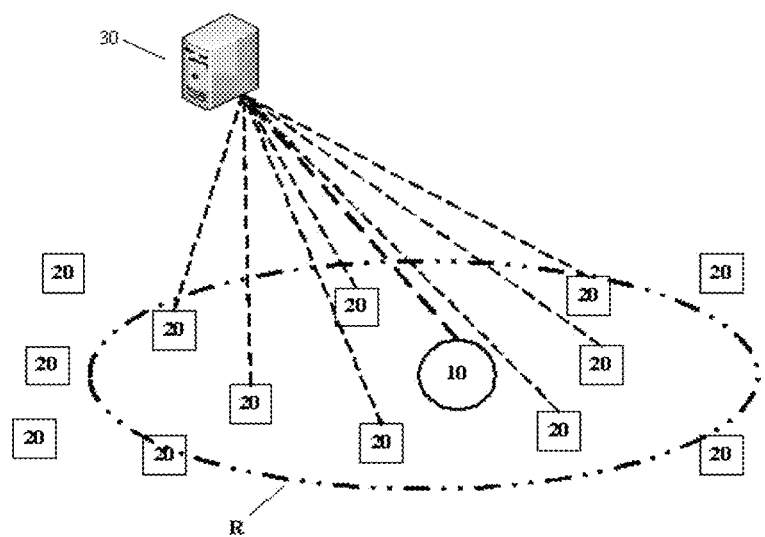
FIG. 1 is a schematic diagram illustrating a case when a mobile base station enters a new geographic area.

FIG. 1 is a schematic diagram illustrating a case when a mobile base station enters a new geographic area. As shown in FIG. 1, a mobile base station 10 enters an area where multiple base stations 20, to which respective PCIs are allocated, are deployed. A network management device 30 can communicate with the mobile base station 10 and each base station 20, and acquire information relating to network configuration within a predetermined range from the mobile base station 10 (as indicated by the dotted circle R). It is to be noted that, the base stations 20 shown in FIG. 1 are not limited to stationary base stations, but may also include other mobile base stations which previously entered this area. Since a large number of base stations 20 are densely deployed in this area, there is a great possibility that the 504 available PCIs have been allocated. When the mobile base station 10 enters this area, a PCI of another base station may be reused for the mobile base station 10.

Figure 2:
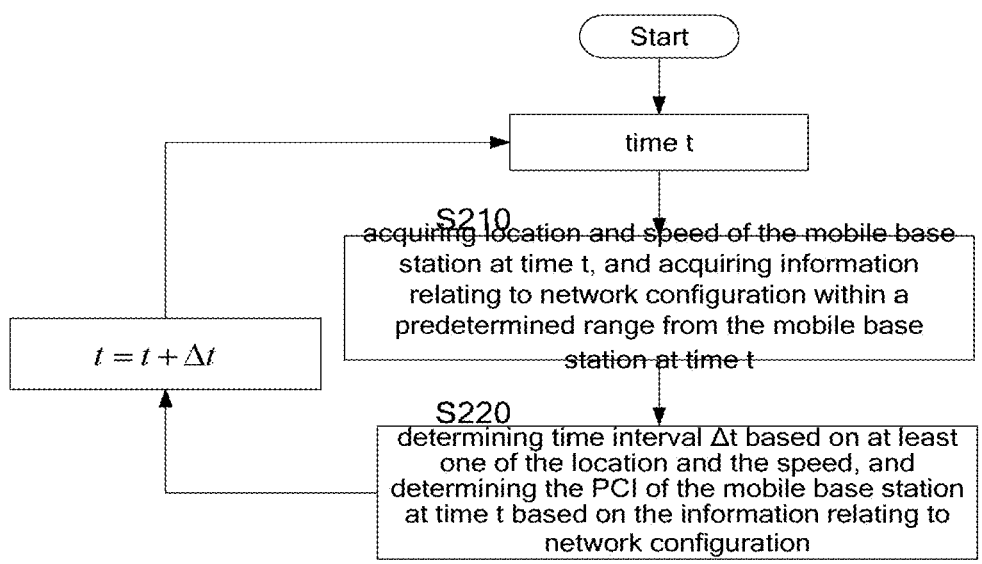
FIG. 2 is a flow chart of a procedure for updating PCI for the mobile base station according to the present disclosure.

FIG. 2 illustrates a flow chart of a procedure for updating PCI for the mobile base station at a certain time interval according to the present disclosure. As shown in FIG. 2, in step S210, location and movement speed of the mobile base station 10 at time t is acquired, and the network management device 30 acquires information relating to the network configuration within the predetermined range from the mobile base station 10 (as indicated by the dotted circle R in FIG. 1) at time t. And then in step S220, a time interval Δt is determined based on at least one of the acquired location and the movement speed of the mobile base station 10, and the PCI for the mobile base station 10 at time t is determined based on the acquired information relating to network configuration. However, after the determined time interval Δt, that is, at time t+Δt, the location and the speed of the mobile base station 10 and the information relating to network configuration within the predetermined range are acquired again. Since the mobile base station 10 moves continuously during the time interval Δt, the network environment may change, and the information relating to network configuration acquired at time t+Δt may be different from the information acquired at time t, thus the PCI for the mobile base station 10 determined at time t+Δt may be different from the PCI determined at time t. It is to be noted that, the present disclosure does not exclude the case where the PCI determined at time t+Δt is the same as the PCI determined at time t. In this case, the PCI for the mobile base station 10 is not updated with a new PCI.

In the following, a criterion for determining the time interval Δt is described. Firstly, the time interval Δt is related to the location of the mobile base station 10. For example, the mobile base station 10 may be disposed on a bus which is traveling in a urban area where a large number of base stations (such as small base stations) are deployed. It is assumed that the travel speed is 60 kilometers/hour. In this case, the time interval Δt may be set to 1 minutes. That is, the PCI is updated when the mobile base station 10 moves for 1 minute (moves over 1 kilometer). It is assumed that the mobile base station 10 is disposed on a high-speed train which is traveling in a suburban area, and the travel speed may be up to 200 kilometers/hour. In this case, the time interval Δt may be set to 30 minutes. That is, the PCI is updated when the mobile base station 10 moves for 30 minutes (moves over 100 kilometers).

Since base stations are densely deployed in the urban area, the network environment may change greatly in a relative small geographic area. Therefore, the PCI for the mobile base station 10 needs to be updated more frequently in order to adapt to the network environment which changes rapidly. Accordingly, the time interval Δt is set to be shorter. In contrast, fewer base stations are deployed in the suburban area, and the base stations in the suburban area are mostly macro base stations with larger coverage. Therefore, the network environment changes in a relatively large geographic area, thus it is not necessary to update the PCI for the mobile base station 10 frequently. Accordingly, the time interval Δt is set to be longer. It is to be noted that, the specific values of the time interval Δt given above are only exemplary for illustrating the concept of the present disclosure and are not intended to limit the present disclosure.

Secondly, the time interval Δt may be related to the movement speed of the mobile base station 10. For a single mobile base station 10, the speed of the mobile base station 10 may indirectly reflect the condition of the environment in which the mobile base station 10 is located. For example, when the mobile base station 10 moves at a movement speed of tens of kilometers per hour or lower, it may be deemed that the mobile base station 10 is in the urban area. When the mobile base station 10 moves at a speed of hundreds of kilometers per hour, it may be deemed that the mobile base station 10 is in the suburban area. Therefore, the time interval Δt may be set based on the movement speed of the mobile base station 10. Specifically, it is assumed that there is a mobile base station 10 which may move to different geographic areas, the time interval Δt may be set to a greater value when the speed of the mobile base station 10 is greater, and may be set to a smaller value when the movement speed of the mobile base station 10 is smaller.

In another aspect, for example, in a case that there are multiple mobile base stations 10 in a specific geographic area (for example, the urban area), that is, in a case that the multiple mobile base stations 10 are in the same or similar network environment, a smaller time interval Δt may be set for a mobile base station with a greater movement speed, while a greater time interval Δt may be set for a mobile base station with a smaller movement speed. This is because the greater movement speed indicates that the mobile base station may leave the current network environment more rapidly and will enter a new network environment where the mobile base station will need to be allocated with a new PCI. In this case, if the time interval Δt is set to a greater value, the PCI cannot be updated timely, and there may be a PCI confliction between the mobile base station and a neighbor base station in the new network environment.

It is to be noted that, determining the time interval Δt based on the movement speed is an optional scheme, and the present disclosure is not limited thereto.

In addition, in the urban area, it is possible that a large number of base stations are deployed in a significantly small geographic area, which results in the available PCIs being used up. Therefore, information relating to network configuration in a relatively small range may be considered when allocating a PCI for the mobile base station. In contrast, in a case that the mobile base station 10 is in the suburban area (in which case the mobile base station 10 usually has a higher speed), information relating to network configuration in a relatively large range may be acquired, since a neighbor base station cannot be included if the range is set to be too small. That is, the range in which the information relating to the network configuration is to be acquired may be determined based on the location or the movement speed of the mobile base station 10.

In the following, a procedure for determining the PCI for the mobile base station based on the acquired information relating to network configuration in step S220 of FIG. 2 is described in detail.

Figure 3:
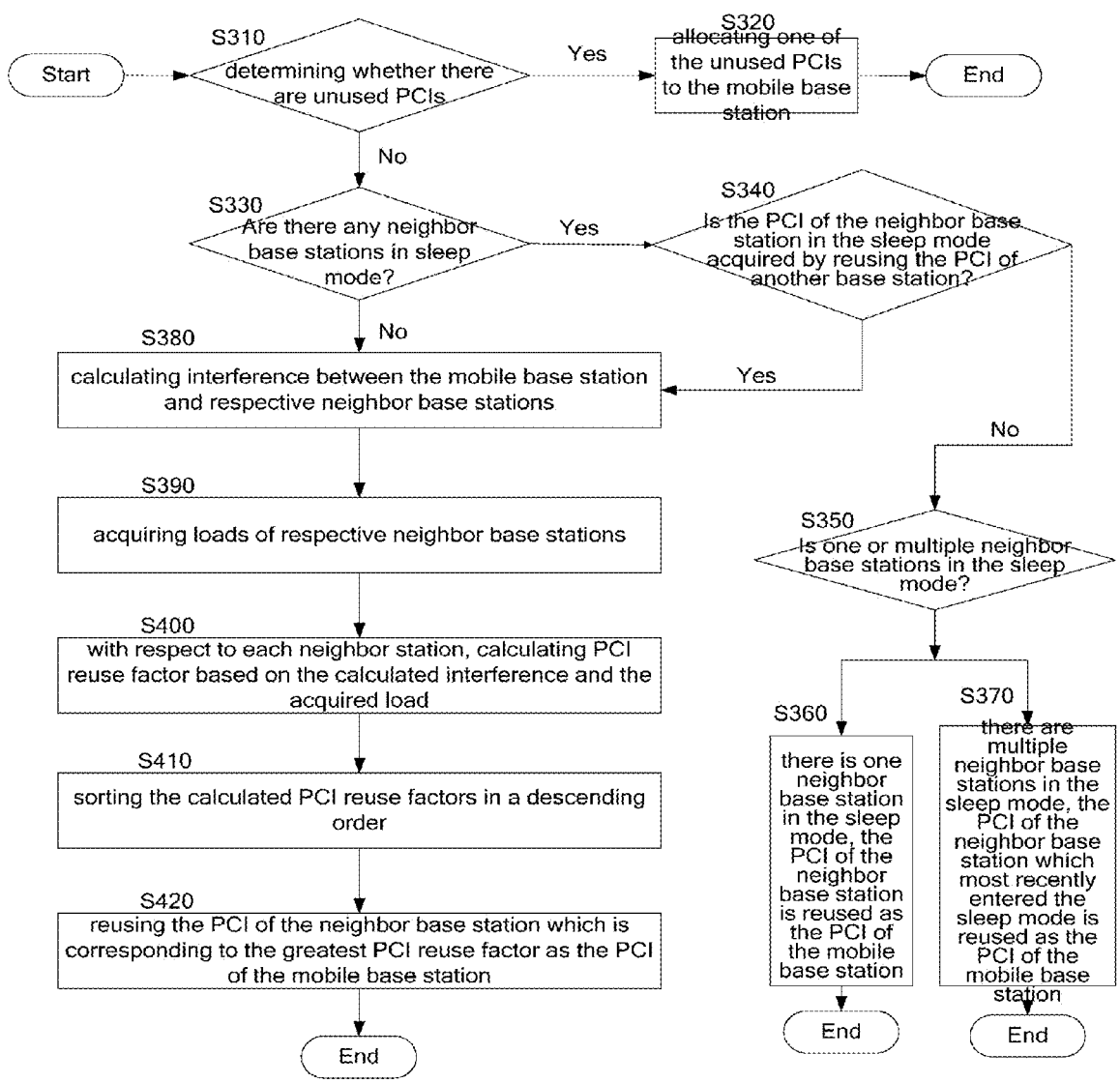
FIG. 3 is a flow chart of a procedure for allocating PCI for the mobile base station according to the present disclosure.

FIG. 3 illustrates a flow chart of a procedure for allocating PCI for the mobile base station 10 based on the information relating to network configuration. The information relating to network configuration may include a list of one or more neighbor base stations within a predetermined range from the mobile base station and interference conditions between the mobile base station and respective neighbor base stations.

The list of neighbor base stations may include: PCIs of the neighbor base stations, indications as to whether the neighbor base stations are in a sleep mode, loads of the neighbor base stations, and the like. The load of the neighbor base station may be indicated by at least one of throughput, amount of buffered data to be processed, the number of users being served, amount of traffic with high demand on quality of service (QoS), and the like, the present disclosure is not limited thereto.

The interference condition between the mobile base station and the neighbor base station may be indicated by at least one of distance between the mobile base station and the neighbor base station, transmission model, path loss, antenna gain, transmission power, receiver sensitivity, and the like. For example, the interference may be indicated simply by the distance or the path loss, or may be indicated by a combination of the path loss, the transmission power and the antenna gain, which are technical means known in the art and will not be described any further here.

Firstly, in step S310, it is determined whether there are any unused PCIs, for example, among the 504 available PCIs, according to the PCIs of the neighbor base stations in the list of neighbor base stations. If there are unused PCIs ("Yes" in step S310), the procedure proceeds to step S320, where one of the unused PCIs is allocated to the mobile base station 10. If there is only one unused PCI, the PCI is allocated to the mobile base station 10, and then the procedure ends.

If there is no unused PCI ("No" in step S310), it means that all the 504 available PCIs are used by the neighbor base stations and no more PCI can be allocated to the mobile base station 10. Therefore, the mobile base station 10 can only reuse the PCI of one of the neighbor base stations. In this case, it is determined whether there are any neighbor base stations in the sleep mode according to the sleep mode indication in the list of neighbor base stations (S330). If there is no neighbor base station in the sleep mode ("No" in step S330), the procedure proceeds to step S380, which is described later. If there is a neighbor base station in the sleep mode ("Yes" in step S330), it is further determined whether the PCI of the neighbor base station in the sleep mode is acquired by reusing a PCI of another base station (step S340). If the determination result in step S340 is "Yes", that is, the PCI of the neighbor base station in the sleep mode is acquired by reusing the PCI of another base station, the procedure proceeds to step S380. If the determination result in step S340 is "No", it is determined whether the number of the neighbor base stations in the sleep mode is one or plural (step S350). If there is only one neighbor base station in the sleep mode, the PCI of the neighbor base station is reused as the PCI of the mobile base station 10 (step S360), then the procedure ends. If it is determined in step S350 that there are multiple neighbor base stations in the sleep mode, the PCI of the neighbor base station which most recently entered the sleep mode (in other words, which has the longest remaining sleep time) is allocated to the mobile base station 10 (step S370), and then the procedure ends. Generally, the longer the base station is in the sleep mode, the more likely that the base station wakes up from the sleep mode in a short period of time and switches to active mode. Therefore, in order to reduce interferences, the PCI of the neighbor base station which is likely to be activated in a short period of time is not reused. Alternatively, a suitable base station in the sleep mode may be selected in other manners. For example, the sleep state of neighbor base station, which includes sleep period, the estimated time at which the base stations will wake up, and the like, may be acquired according to the acquired information relating to network configuration. Therefore, a neighbor base station which is not to be activated in a short period of time may be selected according to these information, and the PCI of the neighbor base station is allocated to the mobile base station 10.

In a case that the result of step S330 is "No" or the result of step S340 is "Yes", the procedure proceeds to step S380, which indicates that the mobile base station 10 must reuse the PCI of the neighbor base station which is activated. In step S380, interference value between the mobile base station 10 and each neighbor base station is calculated based on the distance, the path loss, the antenna gain, the transmission power, and the like included in the information relating to network configuration. And then the procedure proceeds to step S390, where the current load of each neighbor base station is acquired from the list of neighbor base stations. Next, in step S400, for each neighbor station, a PCI reuse factor for the neighbor base station is calculated based on the calculated interference value and the acquired load. The magnitude of the PCI reuse factor indicates a preferred order in which the PCIs of the neighbor base stations are reused as the PCI of the mobile base station 10. That is, a neighbor base station with a greater PCI reuse factor is preferably selected such that the PCI of the neighbor base station is reused as the PCI of the mobile base station 10. In a case that there are multiple neighbor base stations, multiple calculated PCI reuse factors are acquired in step S400, and the multiple calculated PCI reuse factors are sorted in a descending order of magnitude in step S410. The PCI of the neighbor base station corresponding to the greatest PCI reuse factor is reused as the PCI of the mobile base station 10 in step S420, and the procedure ends.

In the following, the method of calculating the PCI reuse factor is described in detail.

In a case that two different PCIs are selected from the 540 available PCIs and used as the PCIs for two base stations, if values acquired by respectively performing modular operation on these two different PCIs are the same, the two base station will interfere with each other. Different modular operations produces difference interferences. In the LTE network, if values acquired by respectively performing mod-3 operation on the two different PCIs are the same, an interference to primary synchronization signal (P-SS) is generated; if values acquired by performing mod-6 operation are the same, an interference to downlink reference signal (RS) is generated. Further, a physical uplink shared channel (PUSCH) carries information on demodulation reference signal (DM-RS) and sounding reference signal (SRS), both reference signals are significant for demodulation and channel estimation. If values acquired by respectively performing mod-30 operation on the two different PCIs are the same, an interference to the DM-RS and the SRS is generated. Therefore, in a case that the mobile base station 10 reuses the PCI of the existing neighbor base station, if same value is acquired after respectively performing the mod-3 operation, the mod-6 operation or the mod-30 operation on the PCI to be used by the mobile base station 10 and the PCI of the neighbor base station, interferences are generated between the mobile base station 10 and the neighbor base station.

The present disclosure proposes a method for calculating the PCI reuse factor based on the above mod-3, mod-6 or mod-30 interference and the load of the neighbor base station. Specifically, in order to avoid any loss of generality, it is assumed that more than one mobile base station enters the new network environment, and there is no unused PCI in the network environment (which indicates, for example, that the 504 available PCIs are used up), and there is not any PCI of the base station in the sleep mode which can be reused. A k-th mobile base station is taken as an example, and PCI_k(m) is used to indicate the PCI value to be allocated to the k-th mobile base station, where m=0, 1, 2, . . . , 503, which indicates all the 504 available PCIs are potential PCIs which can be reused. Further, it is defined that the mod-3 interference generated between a j-th neighbor base station and the k-th mobile base station is I_mod 3_k,j, where j∈{i|mod 3(PCI_i)=mod 3(PCI_k(m))}, and i is an index of a neighbor base station.

It is assumed that PCI value "6" is to be reused as the PCI of the k-th mobile base station, then the result acquired by performing the mod-3 operation on the PCI value "6" is 0. The PCI values of neighbor base stations, on which the mod-3 operation is performed and value "0" is obtained, may include 0, 3, 6, 9, 12, . . . . The mod-3 interference will be generated between the neighbor base stations using these PCI values and the k-th mobile base station. A set of the neighbor base stations using these PCI values is indicated by j.

Similarly, it is defined that the mod-6 interference generated between the neighbor base station and the k-th mobile base station is I_mod 6_k,j, where jε{i|mod 6(PCI_i)=mod 6(PCI_k(m))}, and j indicates a set of neighbor base stations for which the mod-6 interference is generated. In addition, it is defined that the mod-30 interference generated between the neighbor base station and the k-th mobile base station is I_mod 30_k,j, where j∈{i|mod 30(PCI_i)=mod 30(PCI_k (m))}, and j indicates a set of neighbor base stations for which the mod-30 interference is generated.

The above mod-3, mod-6 and mod-30 interferences may be calculated based on the distance between the neighbor base station and the k-th mobile base station, the path loss, the antenna gain, the transmission power, the receiver sensitivity, and the like, the present disclosure is not limited thereto.

In another aspect, the load of the neighbor base station is considered. When the PCI of a certain neighbor base station is reused as the PCI of the mobile base station, the mobile base station will produce interference to the neighbor base station. In this case, the interference to a heavily loaded neighbor base station should be avoided as much as possible. In this regard, PCI reuse criterion according to the present disclosure also takes the load of the neighbor base station (for example, the throughput) into account. Specifically, the PCI of a neighbor base station with a smaller load is preferably reused. That is, the PCI reuse factor calculated for the neighbor base station with a smaller load should be greater.

The method of calculating PCI reuse factor $P_{k(m)}$ based on the interference value and the load of the neighbor base station is provided by the following equation (1).

$$P_{k(m)} = \frac{1}{a3} \sum_{j3 \in \{i|mod3(PCI\_i)=mod3(PCI\_k(m))\}} \frac{1}{I\_mod3\_k, j3 * Th_{j3}} + \frac{1}{a6} \sum_{j6 \in \{i|mod6(PCI\_i)=mod6(PCI\_k(m))\}} \frac{1}{I\_mod6\_k, j6 * Th_{j6}} + \frac{1}{a30} \sum_{j30 \in \{i|mod30(PCI\_i)=mod30(PCI\_k(m))\}} \frac{1}{I\_mod30\_k, j30 * Th_{j30}} \quad (1)$$

where m is a PCI value to be reused as the PCI of the k-th mobile base station, m=0, 1, 2, . . . , 503. As described above, it is assumed that all of the 504 available PCIs are used in the network environment, that is, the PCI value (PCI_i) of the neighbor base station may be 0, 1, 2, . . . , 503. Any one of the 504 PCI values can be reused as the PCI of the k-th mobile base station. j3∈{i|mod 3(PCI_i)=mod 3(PCI_k(m))} indicates the set of neighbor base stations between which and the k-th mobile base station the mod-3 interference is generated, j6∈{i|mod 6(PCI_i)=mod 6(PCI_k(m))} indicates the set of neighbor base stations between which and the k-th mobile base station the mod-6 interference is generated, and j30∈{i|mod 30(PCI_i)=mod 30(PCI_k(m))} indicates the set of neighbor base stations between which and the k-th mobile base station the mod-30 interference is generated. I_mod 3_k,j3 is the value of the mod-3 interference, I_mod 6_k,j6 is the value of the mod-6 interference, and I_mod 30_k,j30 is the value of the mod-30 interference. $Th_{j3}$ is the load of the neighbor base station for which the mod-3 interference is generated, $Th_{j6}$ is the load of the neighbor base station for which the mod-6 interference is generated, and $Th_{j30}$ is the load of the neighbor base station for which the mod-30 interference is generated.

As can be seen from the equation (1), in a case that the value of m takes a specific value from 0 to 503, that is, assuming that this specific value is used as the PCI of the mobile base station, PCI values which have the same mod-3, mod-6 or mod-30 operation result as this specific value can be obtained among the 504 PCIs of the neighbor base stations, and one or more neighbor base stations which use these PCI values can be obtained. For example, for the set j3 of the neighbor base stations which have the same mod-3 operation result, reciprocals of products of the loads of respective neighbor base station and the interference value are summed up to acquire a term $$\sum_{j3 \in \{i|mod3(PCI\_i)=mod3(PCI\_k(m))\}} \frac{1}{I\_mod3\_k, j3 * Th_{j3}}$$

in the case of mod-3 interference, which is referred to as mod-3 component in the following. Similarly, the second term and the third term of the equation (1) respectively illustrates mod-6 component and mod-30 component.

According to degree of tolerance of the base station to the mod-3 interference, the mod-6 interference and the mod-30 interference, weights a3, a6 and a30 are respectively set with respect to the mod-3 component, the mod-6 component and the mod-30 component. Then the mod-3 component, the mod-6 component and the mod-30 component are respectively multiplied by the weights and added, thereby acquiring the PCI reuse factor when a specific value from 0 to 503 is allocated to the k-th mobile base station as the PCI thereof (that is, m takes the specific value). It is to be noted that, the present disclosure is not limited to equation (1), and equation (1) may be modified. For example, the PCI reuse factor may be calculated in consideration of only one or two of the mod-3 component, the mod-6 component and the mod-30 component.

Further, the values of a3, a6 and a30 may be within the range from 0 to 1. If the mod-3 interference has the most serious influence on the base station and should be avoided as much as possible, the weight a3 may be set to 1. If the mod-30 interference has a small influence, the weight a30 may be set to 0.1. It is to be noted that, although the value range and specific values of the weights are provided herein, the present disclosure is not limited thereto, the weights can be arbitrarily set by those skilled in the art according to actual requirements.

As described above, the method of calculating the PCI reuse factor when m takes a specific value is provided by means of equation (1). Since m=0, 1, 2, . . . , 503, 504 PCI reuse factors can be obtained by sequentially calculating the PCI reuse factor for each value of m. Then the obtained PCI reuse factors are sorted in a descending order of magnitude. The value of m corresponding to the maximum PCI reuse factor is selected as the PCI of the mobile base station, that is, a PCI of a neighbor base station corresponding to the maximum PCI reuse factor is reused as the PCI of the k-th mobile base station.

As can be seen from the above equation (1), the PCI reuse factor is inversely proportional to the interference value between base stations, and is inversely proportional to the load of the neighbor base station. Therefore, in a case that a certain neighbor base station has a greater interference to the mobile base station, and/or has a larger load, the PCI reuse factor calculated for the certain neighbor base station is smaller. Since a PCI of a neighbor base station corresponding to a greater PCI reuse factor is preferably selected and reused as the PCI of the mobile base station, the PCI of the neighbor base station which has a greater interference and/or a larger load will not be reused as the PCI of the mobile base station, thereby reducing the adverse effect on the mobile base station and the neighbor base station due to PCI reuse.

Figure 4:
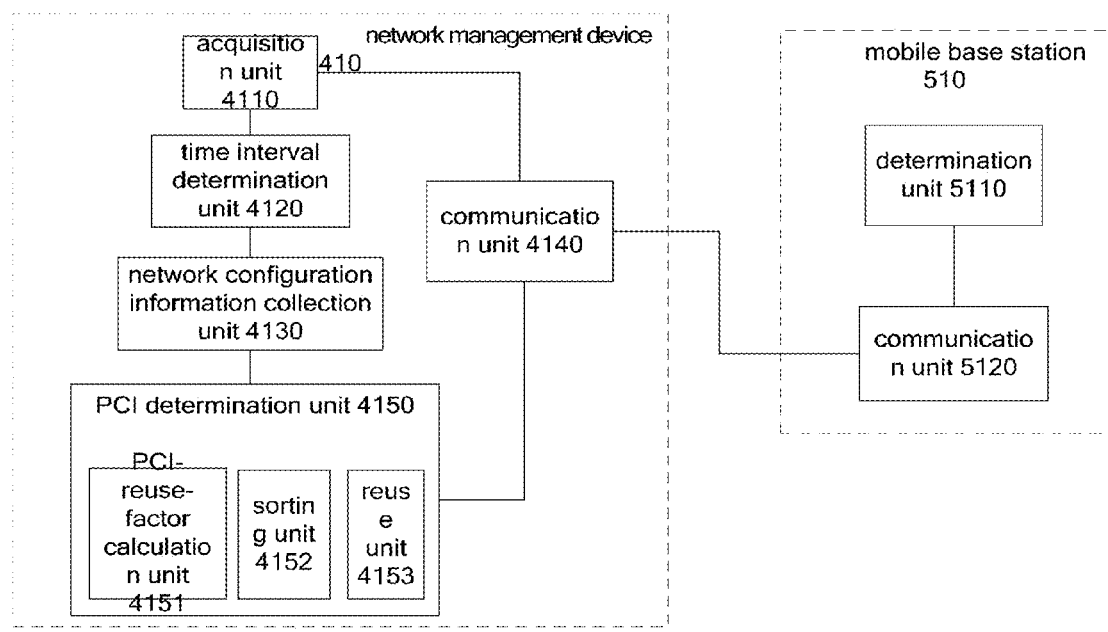
FIG. 4 is a schematic diagram illustrating configuration of a network management device and a mobile base station according to a first embodiment of the disclosure.

In the following, configurations of a network management device 410 and a mobile base station 510 according to the first embodiment of the present disclosure are described in conjunction with FIG. 4. As shown in FIG. 4, the network management device 410 includes an acquisition unit 4110, a time interval determination unit 4120, a network configuration information collection unit 4130, a communication unit 4140 and a PCI determination unit 4150.

The acquisition unit 4110 acquires location of the mobile base station 510, and optionally acquires movement speed of the mobile base station 510. The location and/or movement speed of the mobile base station 510 may be acquired, for example, in the manner that the acquisition unit 4110 requests a report from the base station 510, or the acquisition unit 4110 calculates the speed of the mobile base station 510 based on a distance between two locations at which two reports are transmitted respectively and a time difference between two time points at which the two reports are transmitted respectively.

The time interval determination unit 4120 is configured to determine time interval Δt for updating the PCI for the mobile base station 510 based on at least one of the acquired location and the movement speed of the mobile base station 510. Since the PCI of the mobile base station 510 is updated when the time interval Δt is expired, that is, the valid time of the currently used PCI of the mobile base station is equal to the time interval Δt, the time interval Δt is also referred to as valid time interval for PCI. When the determined valid time interval Δt is expired, the network configuration information collection unit 4130 collects information relating to network configuration within a predetermined range from the mobile base station 510, and meanwhile the acquisition unit 4110 acquires the location and/or movement speed of the mobile base station 510 again, such that the time interval determination unit 4120 determines the next time interval Δt based on the reacquired location and/or speed.

The PCI determination unit 4150 is configured to reuse a suitable PCI of a neighbor base station as the PCI of the mobile base station 510 based on the collected information relating to network configuration. The PCI determination unit 4150 further includes a PCI-reuse-factor calculation unit 4151, a sorting unit 4152 and a reuse unit 4153. The PCI-reuse-factor calculation unit 4151 calculates PCI reuse factor with respect to PCI of each neighbor base station (that is, m=0, 1, 2, . . . , 503 as described above) based on the interference value between the mobile base station 510 and the neighbor base station as well as the load of the neighbor base station, thereby acquiring multiple PCI reuse factors. The sorting unit 4152 sorts the acquired multiple PCI reuse factors in a descending order of magnitude. The reuse unit 4153 reuses a PCI of a neighbor base station corresponding to the maximum PCI reuse factor as the PCI of the mobile base station 510, and the new PCI is notified to the mobile base station 510 via the communication unit 4140.

Optionally, instead of acquiring the location and/or speed of the mobile base station 510 by the acquisition unit 4110 of the network management device 410, the location and/or speed of the mobile base station 510 may be determined by a determination unit 5110 of the mobile base station 510, and then reported to the network management device 410 through the communication unit 5120. The time interval determination unit 4120 of the network management device 410 determines the valid time interval Δt based on the location and/or speed, and transmits the time interval Δt to the mobile base station 510. When the time interval Δt is expired, the mobile base station 510 reports its location and/or speed again through the communication unit 5120. Specifically, it is not necessary for the mobile base station 510 to report the location and/or speed at the time interval Δt. When a specific event occurs, for example, when the determination unit 5110 of the mobile base station 510 determines that its movement speed varies significantly (for example, the speed variation exceeds a predetermined threshold), the mobile base station 510 can immediately report the varied speed to the network management device 410, regardless of the time interval Δt. In other words, the report of the location/speed information by the mobile base station 510 may be triggered periodically or based on events.

Figure 5:
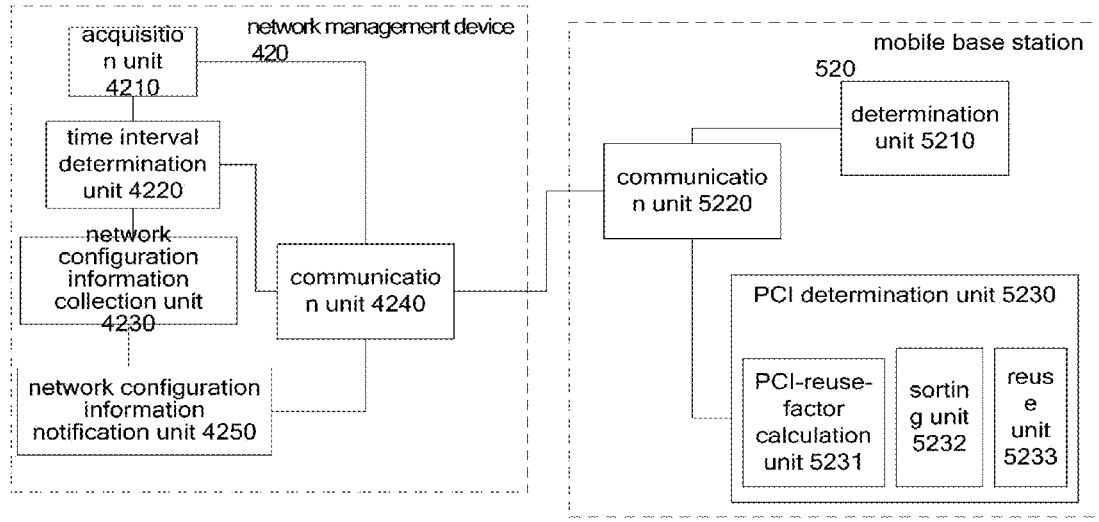
FIG. 5 is a schematic diagram illustrating configuration of a network management device and a mobile base station according to a second embodiment of the disclosure.

FIG. 5 illustrates configurations of a network management device 420 and a mobile base station 520 according to the second embodiment of the present disclosure. As shown in FIG. 4, the network management device 420 includes an acquisition unit 4210, a time interval determination unit 4220, a network configuration information collection unit 4230, a communication unit 4240 and a network configuration information notification unit 4250. The mobile base station 520 includes a determination unit 5210, a communication unit 5220 and a PCI determination unit 5230.

The determination unit 5210 of the mobile base station 520 is configured to determine location and/or movement speed of the mobile base station 520, and transmits the determined location and/or movement speed to the acquisition unit 4210 of the network management device 420 through the communication unit 5220. The time interval determination unit 4220 of the network management device 420 determines the valid time interval Δt for updating the PCI for the mobile base station 520 based on the received location and/or speed, and transmits the time interval Δt to the mobile base station 520 through the communication unit 4240. When the determined valid time interval Δt is expired, the network configuration information collection unit 4230 of the network management device 420 collects information relating to network configuration within a predetermined range from the mobile base station 520, and the network configuration information notification unit 4250 notifies the information relating to network configuration to the mobile base station 520. In addition, when the time interval Δt is expired, the mobile base station 520 reports its location or speed at the that time again.

In contrast to the first embodiment, the mobile base station 520 according to the second embodiment includes the PCI determination unit 5230, which is configured to determine which neighbor base station's PCI is to be reused according the received information relating to network configuration. Specifically, the PCI determination unit 5230 includes a PCI-reuse-factor calculation unit 5231, a sorting unit 5232 and a reuse unit 5233. The function of the PCI-reuse-factor calculation unit 5231 is substantially the same as the function of the PCI-reuse-factor calculation unit 4151 of the network management unit 410 in the first embodiment, i.e., calculating PCI reuse factor with respect to PCI of each neighbor base station within a predetermined range from the mobile base station 520 based on the received information relating to network configuration, thereby acquiring multiple PCI reuse factors. Then the sorting unit 5232 sorts the acquired multiple PCI reuse factors in a descending order of magnitude. The reuse unit 5233 reuses a PCI of a neighbor base station corresponding to the maximum PCI reuse factor as the PCI of the mobile base station 520, and the new PCI is notified to the network management device 420 through the communication unit 5220.

Figure 6:
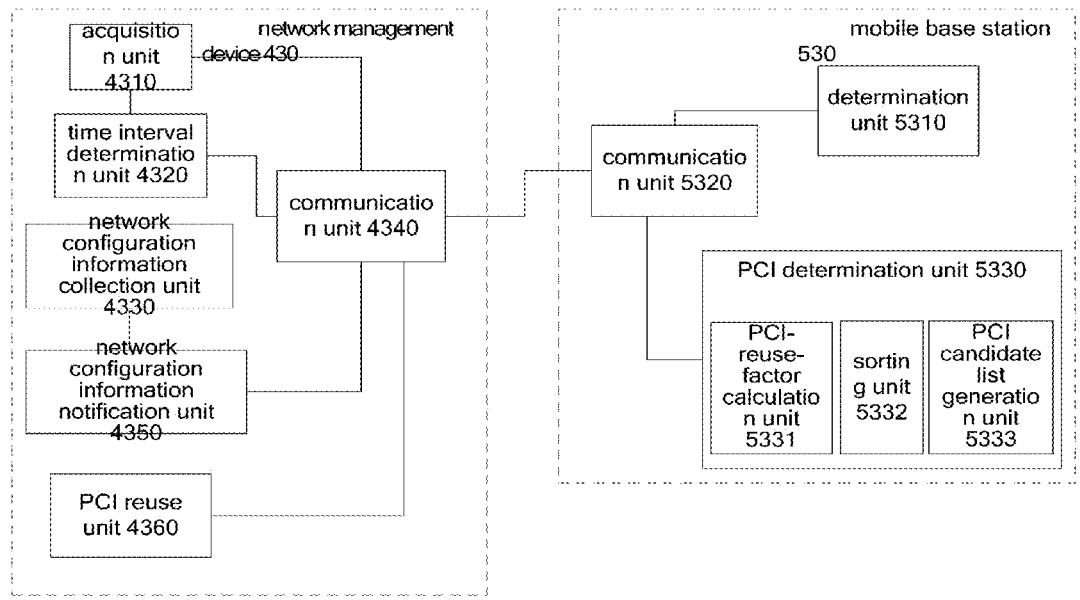
FIG. 6 is a schematic diagram illustrating configuration of a network management device and a mobile base station according to a third embodiment of the disclosure.

FIG. 6 illustrates configurations of a network management device 430 and a mobile base station 530 according to the third embodiment of the present disclosure. As shown in FIG. 6, the network management device 430 includes an acquisition unit 4310, a time interval determination unit 4320, a network configuration information collection unit 4330, a communication unit 4340 and a network configuration information notification unit 4350, of which the functions are the same as functions of corresponding components shown in FIG. 5 and will not be repeatedly described here. The mobile base station 530 includes the determination unit 5310 and the communication unit 5320, of which the functions are the same as functions of corresponding components shown in FIG. 5 and will not be repeatedly described here. In the following, the third embodiment will be described mainly with respect to the difference from the second embodiment.

As shown in FIG. 6, the mobile base station 530 includes a PCI determination unit 5330. The PCI determination unit 5330 includes a PCI-reuse-factor calculation unit 5331, a sorting unit 5332 and a PCI candidate list generation unit 5333.

The PCI-reuse-factor calculation unit 5331 calculate PCI reuse factor with respect to PCI of each neighbor base stations based on the information relating to network configuration received by the communication unit 5320 from the network management device 430, thereby acquiring multiple PCI reuse factors. The sorting unit 5332 sorts the acquired PCI reuse factors in a descending order. The PCI candidate list generation unit 5333 generates a PCI candidate list based on the multiple PCI reuse factors sorted in the descending order. The PCI candidate list includes PCIs of multiple neighbor base stations which correspond to the multiple PCI reuse factors sorted in the descending order. As described above, A PCI of a neighbor base station corresponding to a greater PCI reuse factor is preferably selected to be reused. Therefore, the PCI of the neighbor base station which appears higher in the PCI candidate list is more likely to be reused as the PCI of the mobile base station 530. Then, the generated PCI candidate list is transmitted to the network management device 430 through the communication unit 5320. The PCI reuse unit 4360 in the network management device 430 preferably selects the PCI of the neighbor base station which appears highest in the PCI candidate list to reuse it as the PCI of the mobile base station 530, and notifies the mobile base station 530 of the new PCI through the communication unit 4340.

As described above, it is assumed in the present disclosure a case that there are more than one mobile base stations which enter the new network environment and need to reuse PCIs of neighbor base stations. In a case that there are at least two mobile base stations which are located close to each other and need to reuse PCIs, the PCI candidate lists generated for the at least two mobile base stations may be the same. In this case, the network management device 430 allocates a PCI of a neighbor base station corresponding to a greater PCI reuse factor to one of the at least two mobile base stations which has the lower movement speed, and allocates a PCI of a neighbor base station corresponding to a smaller PCI reuse factor to the mobile base station which has the higher movement speed. This is because the mobile base station which moves slower is more likely to stay in the network environment for a longer period of time, which results in longer duration of the interference of the mobile base station to the neighbor base station. Therefore, a better PCI (which indicates a smaller interference to neighbor base station, or interference to a neighbor base station with smaller load) is allocated to this mobile base station. In the contrast, the mobile base station which moves faster is more likely to leave the network environment very soon, which results in a shorter duration of the interference. Therefore, a relative poor PCI is allocated to this mobile base station.

The present disclosure is described in the foregoing by reference to specific embodiments. However, it should be understood that, the present disclosure is not limited to the above embodiments. The embodiments can be modified by substituting or combining components or steps in each of the embodiments. For example, in the above first to third embodiments, it is described that the network management device determines the valid time interval Δt for updating the PCI based on at least one of the location and the speed of the mobile base station. However, the function of determining the time interval can also be performed by the mobile base station. That is, the mobile base station determines its location and/or movement speed, determines the time interval Δt based on the location and/or speed, and transmits the determined time interval Δt to the network management device through the communication unit, such that the network management device is able to acquire the information relating to network configuration when the time interval Δt is expired. After that, as described in the first to third embodiments, the PCI of the mobile base station may be updated by the network management device or the mobile base station based on the information relating to network configuration. In another aspect, the mobile base station determines the next time interval Δt based on its location and/or speed when the time interval Δt is expired.

A method of managing a PCI for a mobile base station is provided according to the present disclosure, where the method includes: determining a valid time interval for PCI based on at least one of a location and a movement speed of the mobile base station, collecting information relating to network configuration within a predetermined range in the vicinity of the mobile base station when the valid time interval for PCI is expired, and reusing a PCI of one of the neighbor base stations within the predetermined range as the PCI of the mobile base station based on the information relating to network configuration. Further, there is also provided an electronic device for managing a PCI for a mobile base station, which includes one or more processors for performing the above method.

In another aspect, there is provided according to the present disclosure an electronic device on a mobile base station side, which includes one or more processors configured to executing the following processing: determining a location and a movement speed of the mobile base station, and determining an updated PCI for the mobile base station when a valid time interval for PCI is expired, where the valid time interval is related to at least one of the location and the movement speed of the mobile base station.

It is to be noted that, each device or component in the present disclosure is only described in a logical sense, rather than strictly corresponding to a physical device or component. For example, the function of each component described in the present disclosure may be implemented by multiple physical entities, or functions of multiple components described in the present disclosure may be implemented by a single physical entity.

A series of processes executed by each device or component in the above embodiments may be implemented by software, hardware or a combination of software and hardware. Programs included in the software may be pre-stored in for example a storage medium disposed inside or external to each device or component. As an example, during execution, these programs are written into a random access memory (RAM) and executed by a processor (for example, CPU).

Figure 7:
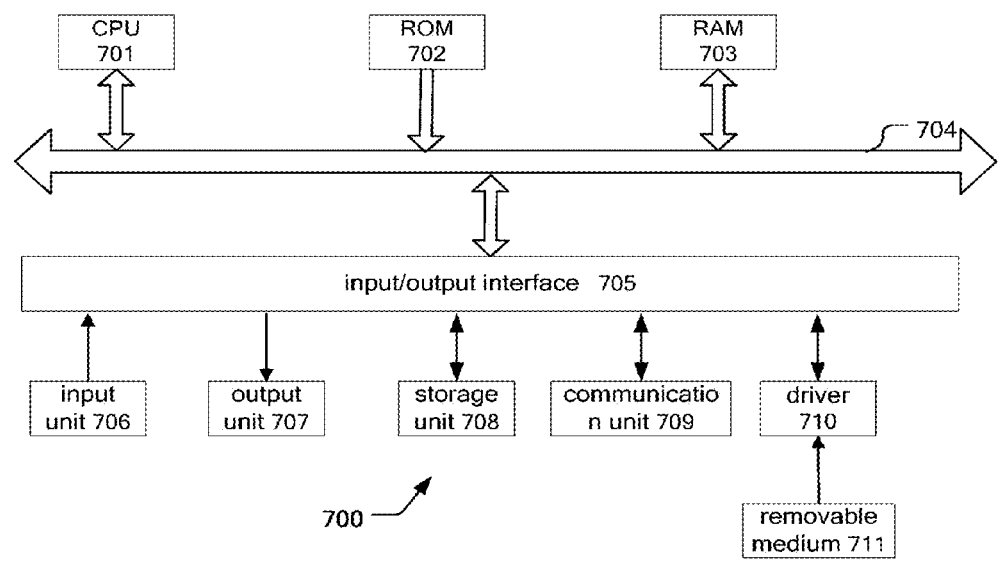
FIG. 7 is a block diagram illustrating an exemplary configuration of computer hardware.

FIG. 7 is a block diagram illustrating an exemplary configuration of computer hardware for executing the above processes according to the programs.

In the computer, a central processing unit (CPU) 701, a read-only memory (702) and a random access memory (RAM) 703 are connected with each other via a bus 704.

An input/output interface 705 is further connected with the bus 704. The input/output interface 705 is connected to the following components: an input unit 706 formed by a keyboard, a mouse, a microphone and the like; an output unit 707 formed by a display, a speaker and the like; a storage unit 708 formed by a hard disk, a nonvolatile memory and the like; a communication unit 709 formed by a network interface card (such as a local area network (LAN) card, a modem); and a driver 710 for driving a removable medium 711 such as magnetic disk, optical disk, magneto-optical disk or semiconductor memory.

In the computer with the above structure, the CUP 701 loads the programs stored in the storage unit 708 into the RAM 703 via the input/output interface 705 and the bus 704, and executes the programs, in order to execute the above processes.

The programs to be executed by the computer (the CPU 701) may be recorded on the removable medium 711 which is package medium and may be formed by a magnetic disk (including a floppy disk), an optical disk (including a compact disk-read only memory (CD-ROM), a digital versatile disk (DVD) and the like), a magneto-optical disk or a semiconductor memory. Further, the programs to be executed by the computer (the CPU 701) may also be provided via wired or wireless transmission media such as local area network, Internet or digital satellite broadcast.

When the removable medium 711 is loaded in the driver 710, the programs may be installed into the storage unit 708 via the input/output interface 705. Further, the programs may be received by the communication unit 709 via wired or wireless transmission media, and installed into the storage unit 708. Alternatively, the programs may be pre-installed in the ROM 702 or the storage unit 708.

The programs to be executed by the computer may be programs for executing processes in the order described in the specification, or may be programs for executing processes in parallel or executing processes when required (such as when invoked).

The embodiments and the technical effects of the present disclosure have been described above in detail in connection with the drawings. However, the scope of the present disclosure is not limited thereto. Those skilled in the art will appreciate that, depending on design requirements and other factors, various modifications or variations can be made to the embodiments discussed herein without departing from the principle and spirit of the present disclosure. The scope of the present disclosure is defined by the appended claims and their equivalents.

Further, the present disclosure may also be implemented as follows.

(1) An electronic device for managing a mobile base station, comprising:

an acquisition unit configured to acquire location and movement speed of the mobile base station; and a determination unit configured to determine, in response to the acquisition, a valid time interval for physical cell identity (PCI) of the mobile base station based on at least one of the location and the movement speed.

(2) The electronic device according to (1), further including an information collection unit configured to collect, in response to the determination, information relating to network configuration within a predetermined range where the mobile base station is located, when the valid time interval is expired, so as to determine the PCI of the mobile base station.

(3) The electronic device according to (2), further comprising a network configuration notification unit configured to transmit the information relating to the network configuration within the predetermined range where the mobile base station is located to the mobile base station.

(4) The electronic device according to (1), where the acquisition unit is further configured to acquire the location and the movement speed of the mobile base station again when the valid time interval is expired.

(5) The electronic device according to (2) or (3), where the information relating to the network configuration comprises PCIs of one or more neighbor base stations within a predetermined distance from the mobile base station, and at least one of interference conditions between the mobile base station and respective neighbor base stations and loads of the one or more neighbor base stations.

(6) The electronic device according to (5), further comprising a PCI determination unit configured to determine the PCI of the mobile base station based on the information relating to the network configuration within the predetermined range where the mobile base station is located.

(7) The electronic device according to (6), the PCI determination unit is further configured to reuse the PCI of one of the one or more neighbor base stations as the PCI of the mobile base station based on the information relating to the network configuration.

(8) The electronic device according to (7), where the PCI determination unit comprises:

a PCI-reuse-factor calculation unit configured to calculate PCI reuse factors with respect to PCI of each neighbor base station based on the interference condition between the mobile base station and the each neighbor base station as well as the load of the neighbor base station; and a reuse unit configured to reuse the PCI of the neighbor base station which is corresponding to a maximum PCI reuse factor as the PCI of the mobile base station.

(9) The electronic device according to (7), where the PCI of a specific neighbor base station among the one or more neighbor base stations which has less interference with the mobile base station corresponds to a greater PCI reuse factor.

(10) The electronic device according to (7), where the PCI of a specific neighbor base station among the one or more neighbor base stations which has a smaller load corresponds to a greater PCI reuse factor.

(11) The electronic device according to (7), where the reuse unit is configured to, in a case that PCIs are to be allocated to at least two mobile base stations which are close to each other, reuse the PCI of the neighbor base station which is corresponding to a greater PCI reuse factor as the PCI of one of the at least two mobile base stations which has a lower movement speed, and reuse the PCI of the neighbor base station which is corresponding to a smaller PCI reuse factor as the PCI of one of the at least two mobile base stations which has a higher movement speed.

(12) The electronic device according to (7), where the PCI reuse unit is configured to, in a case that one or more of the one or more neighbor base stations are in sleep mode, reuse the PCI of the neighbor base station which most recently entered the sleep mode as the PCI of the mobile base station.

(13) The electronic device according to (1), where in a case that the movement speed of the mobile base station is higher, the determined time interval is smaller.

(14) The electronic device according to (1), where in a case that a larger number of neighbor base stations are located in the vicinity of the mobile base station, the determined time interval is smaller.

(15) The electronic device according to (5), where in a case that the movement speed of the mobile base station is higher, the predetermined distance is larger.

(16) The electronic device according to (5), where in a case that a larger number of neighbor base stations are located in the vicinity of the mobile base station, the predetermined distance is smaller.

(17) A method for managing a mobile base station, comprising:

acquiring location and movement speed of the mobile base station; and determining, in response to the acquisition, a valid time interval for physical cell identity (PCI) of the mobile base station based on at least one of the location and the movement speed.

(18) The method according to (17), further including:

collecting, in response to the determination, information relating to network configuration within a predetermined range where the mobile base station is located, when the valid time interval is expired; and reusing the PCI of one of the one or more neighbor base stations within the predetermined range as the PCI of the mobile base station based on the information relating to the network configuration.

(19) The method according to (17), further comprising: acquiring the current location and the movement speed of the mobile base station again when the valid time interval is expired.

(20) The method according to (18), where the information relating to the network configuration comprises PCIs of the one or more neighbor base stations within a predetermined distance from the mobile base station, interference conditions between the mobile base station and respective neighbor base stations and loads of the one or more neighbor base stations.

(21) The method according to (18), further comprising: reusing the PCI of one of the one or more neighbor base stations as the PCI of the mobile base station based on the information relating to the network configuration.

(22) The method according to (21), where the reusing comprises: calculating PCI reuse factor with respect to PCI of each neighbor base station based on the interference condition between the mobile base station and each neighbor base station as well as the load of the neighbor base station, sorting the calculated one or more PCI reuse factors in a descending order, and reusing the PCI of the neighbor base station which is corresponding to a maximum PCI reuse factor as the PCI of the mobile base station.

(23) An electronic device for managing a mobile base station, including: one or more processors configured to acquire location and movement speed of the mobile base station; and determine, in response to the acquisition, a valid time interval for physical cell identity (PCI) of the mobile base station based on at least one of the location and the movement speed.

(24) The electronic device according to (23), where the one or more processor is further configured to: collect, in response to the determination, information relating to network configuration within a predetermined range where the mobile base station is located when the valid time interval is expired; and reusing the PCI of one of one or more neighboring base stations within the predetermined range as the PCI of the mobile base station based on the information relating to the network configuration.

(25) An electronic device on a mobile base station side, comprising:
a determination unit configured to determine location and movement speed of the mobile base station; and
a physical cell identity (PCI) determination unit configured to determine an updated PCI of the mobile base station when a valid time interval for the PCI of the mobile base station is expired,
where the valid time interval is related to at least one of the location and the movement speed of the mobile base station.

(26) The electronic device according to (25), further comprising:
a communication unit configured to transmit the determined location of the mobile base station to a network management device when the valid time interval is expired, and receive, from the network management device, information relating to network configuration within a predetermined range where the mobile base station is located, where the PCI determination unit is configured to determine the updated PCI based on the information relating to the network configuration.

(27) The electronic device according to (26), where the PCI determination unit comprises:
a PCI-reuse-factor calculation unit configured to calculate PCI reuse factors with respect to PCI of each of one or more neighbor base stations within a predetermined distance from the mobile base station, based on the received information relating to the network configuration; and
a reuse unit configured to reuse the PCI of the neighbor base station which is corresponding to a maximum PCI reuse factor as the updated PCI of the mobile base station.

(28) The electronic device according to (26), where the PCI determination unit comprises:
a PCI-reuse-factor calculation unit configured to calculate PCI reuse factors with respect to PCI of each of one or more neighbor base stations within a predetermined distance from the mobile base station, based on the received information relating to the network configuration; and
a PCI candidate list generation unit configured to generate a PCI candidate list based on one or more calculated PCI reuse factors in a descending order, the PCI candidate list comprising PCIs of the one or more neighbor base stations which correspond to the one or more PCI reuse factors in the descending order,
where the communication unit is configured to transmits the PCI candidate list to the network management device to request allocation of PCI,
where the PCI determination unit is configured to use the PCI allocated by the network management device as the updated PCI of the mobile base station.

(29) The electronic device according to (26), where the information relating to the network configuration comprises the PCIs of the one or more neighbor base stations, and at least one of interference conditions between the mobile base station and respective neighbor base stations and loads of the one or more neighbor base stations.

(30) An electronic device on a mobile base station side, comprising:
one or more processors configured to:
determine location and movement speed of the mobile base station; and
determine an updated physical cell identity (PCI) of the mobile base station when a valid time interval for the PCI of the mobile base station is expired,
where the valid time interval is related to at least one of the location and the movement speed of the mobile base station.

The invention claimed is:
1. An electronic device for managing a mobile base station, comprising:
circuitry configured to
acquire location information of the mobile base station;
determine, in response to the acquisition, a valid time interval for physical cell identity (PCI) of the mobile base station based on the location information; and
collect, in response to the determination, information relating to network configuration within a specified distance from the mobile base station, when the valid time interval is expired, so as to determine the PCI of the mobile base station,
wherein the information relating to the network configuration comprises PCIs of one or more neighbor base stations within the specified distance from the mobile base station, and at least one of interference conditions between the mobile base station and respective neighbor base stations and loads of the one or more neighbor base stations.

2. The electronic device according to claim 1, wherein the location information comprises at least one of location of the mobile base station and movement speed of the mobile base station.

3. The electronic device according to claim 1, wherein the circuitry is further configured to transmit to the mobile base station the information relating to the network configuration within the specified distance from the mobile base.

4. The electronic device according to claim 1, wherein the circuitry is further configured to acquire the location and the movement speed of the mobile base station again when the valid time interval is expired.

5. The electronic device according to claim 1, wherein the circuitry is further configured to determine the PCI of the mobile base station based on the information relating to the network configuration within the specified distance from the mobile base station.

6. The electronic device according to claim 5, wherein the circuitry is further configured to reuse the PCI of one of the one or more neighbor base stations as the PCI of the mobile base station based on the information relating to the network configuration.

7. The electronic device according to claim 6, wherein the circuitry is further configured to, in a case that one or more of the one or more neighbor base stations are in sleep mode, reuse the PCI of the neighbor base station which most recently entered the sleep mode as the PCI of the mobile base station.

8. A method for managing a mobile base station, comprising:
    acquiring location information of the mobile base station;
    determining, in response to the acquisition, a valid time interval for physical cell identity (PCI) of the mobile base station based on the location information;
    collecting, in response to the determination, information relating to network configuration within a specified distance from the mobile base station, when the valid time interval is expired, so as to determine the PCI of the mobile base station, wherein
        the information relating to the network configuration comprises PCIs of one or more neighbor base stations within the specified distance from the mobile base station, and at least one of interference conditions between the mobile base station and respective neighbor base stations and loads of the one or more neighbor base stations; and
    reusing the PCI of one of one or more neighbor base stations within the specified distance as the PCI of the mobile base station based on the information relating to the network configuration.

9. The method according to claim 8, wherein the location information comprises at least one of location of the mobile base station and movement speed of the mobile base station.

10. An electronic device for managing a mobile base station, comprising:
    one or more processors configured to:
        acquire location information of the mobile base station;
        determine, in response to the acquisition, a valid time interval for physical cell identity (PCI) of the mobile base station based on the location information;
        collect, in response to the determination, information relating to network configuration within a specified distance from the mobile base station when the valid time interval is expired, so as to determine the PCI of the mobile base station, wherein
            the information relating to the network configuration comprises PCIs of one or more neighbor base stations within the specified distance from the mobile base station, and at least one of interference conditions between the mobile base station and respective neighbor base stations and loads of the one or more neighbor base stations; and
        reuse the PCI of one of one or more neighboring base stations within the specified distance as the PCI of the mobile base station based on the information relating to the network configuration.

11. The electronic device according to claim 10, wherein the location information comprises at least one of location of the mobile base station and movement speed of the mobile base station.

12. An electronic device on a mobile base station side, comprising:
    circuitry configured to
        determine location information of the mobile base station;
        transmit the determined location of the mobile base station to a network management device when a valid time interval for the physical cell identity (PCI) of the mobile base station is expired, and receive, from the network management device, information relating to network configuration within a specified distance from the mobile base station; and
        determine an updated PCI of the mobile base station when the valid time interval for the PCI of the mobile base station is expired,
    wherein the circuitry is configured to determine the updated PCI based on the information relating to the network configuration, and
    wherein the valid time interval is related to the location information of the mobile base station.

13. The electronic device according to claim 12, wherein the location information comprises at least one of location of the mobile base station and movement speed of the mobile base station.

14. The electronic device according to claim 12, wherein the circuitry is further configured to
    calculate PCI reuse factor with respect to PCI of each of one or more neighbor base stations within the specified distance from the mobile base station, based on the received information relating to the network configuration; and
    reuse the PCI of the neighbor base station which is corresponding to a maximum PCI reuse factor as the updated PCI of the mobile base station.

15. The electronic device according to claim 12, wherein the information relating to the network configuration comprises the PCIs of the one or more neighbor base stations, and at least one of interference conditions between the mobile base station and respective neighbor base stations and loads of the one or more neighbor base stations.

* * * * *